US005661698A

United States Patent [19]
Cacas

[11] Patent Number: 5,661,698
[45] Date of Patent: Aug. 26, 1997

[54] METHOD FOR MODELLING THE SPATIAL DISTRIBUTION OF GEOMETRIC OBJECTS IN AN ENVIRONMENT, SUCH AS FAULTS IN A GEOLOGIC FORMATION

[75] Inventor: Marie-Christine Cacas, Nanterre, France

[73] Assignee: Institut Francais du Petrole, Rueil Malmaison, France

[21] Appl. No.: 544,729

[22] Filed: Oct. 18, 1995

[30] Foreign Application Priority Data

Oct. 18, 1994 [FR] France .................... 94 12514

[51] Int. Cl.$^6$ .................................................. G01V 1/30
[52] U.S. Cl. .................................................. 367/73
[58] Field of Search ........................ 367/73; 364/421

[56] References Cited

U.S. PATENT DOCUMENTS 4,972,383  11/1990  Lailly ............................ 367/73

OTHER PUBLICATIONS

Proceedings Southeastcon '90, vol. 2 1 Apr. 1990–4 Apr. 1990, New Orleans, Lousiana, pp. 427–429; Robertson, et al "Simulating Topographic Features with Fractals".
Nature, vol. 353, 19 Sep. 1991 USA, pp. 250–252, S. J. Teacy, et al. "An Automation for Fractal Patterns of Fragmentation".
Proc. Nat. Acad. Sci., vol. 72, No. 10, Oct. 1975 USA, pp. 3825–3828; B. B. Mandelbrot "Stochastic Models for the Earth's Relief, the Shape and the Fractal Dimension of the Coastlines, and ... ".

Nature, vol. 348, No. 1, 1 Nov. 1990 USA, pp. 56–58; Ph. Davy et al "Some Consequences of a Proposed Fractal Nature of Continental Faulting".

*Primary Examiner*—Ian J. Lobo
*Attorney, Agent, or Firm*—Antonelli, Terry, Stout & Kraus, LLP

[57] ABSTRACT

A method for modelling a configuration of a fault network in a subsoil zone including a group of major faults detected by means of an exploration of the zone, by positioning also in the fault network, corresponding to an identical tectonic event, minor faults that have not been detected during the exploration is disclosed. The method includes analyzing the fault network to determine fractal characteristics thereof successively by randomly selecting minor faults and positioning each of the minor faults by determining a fractal dimension of the fault network and a density function defining a distribution of lengths of the faults; selecting a range of lengths of the faults by extrapolation of the defined distribution of the lengths of the faults; and successively randomly positioning the minor faults in the fault network and testing positioning thereof to check if the fault network with each of the positioned minor faults remains a fractal fault network.

16 Claims, 5 Drawing Sheets the data: a network of major faults objects to be added the completed network

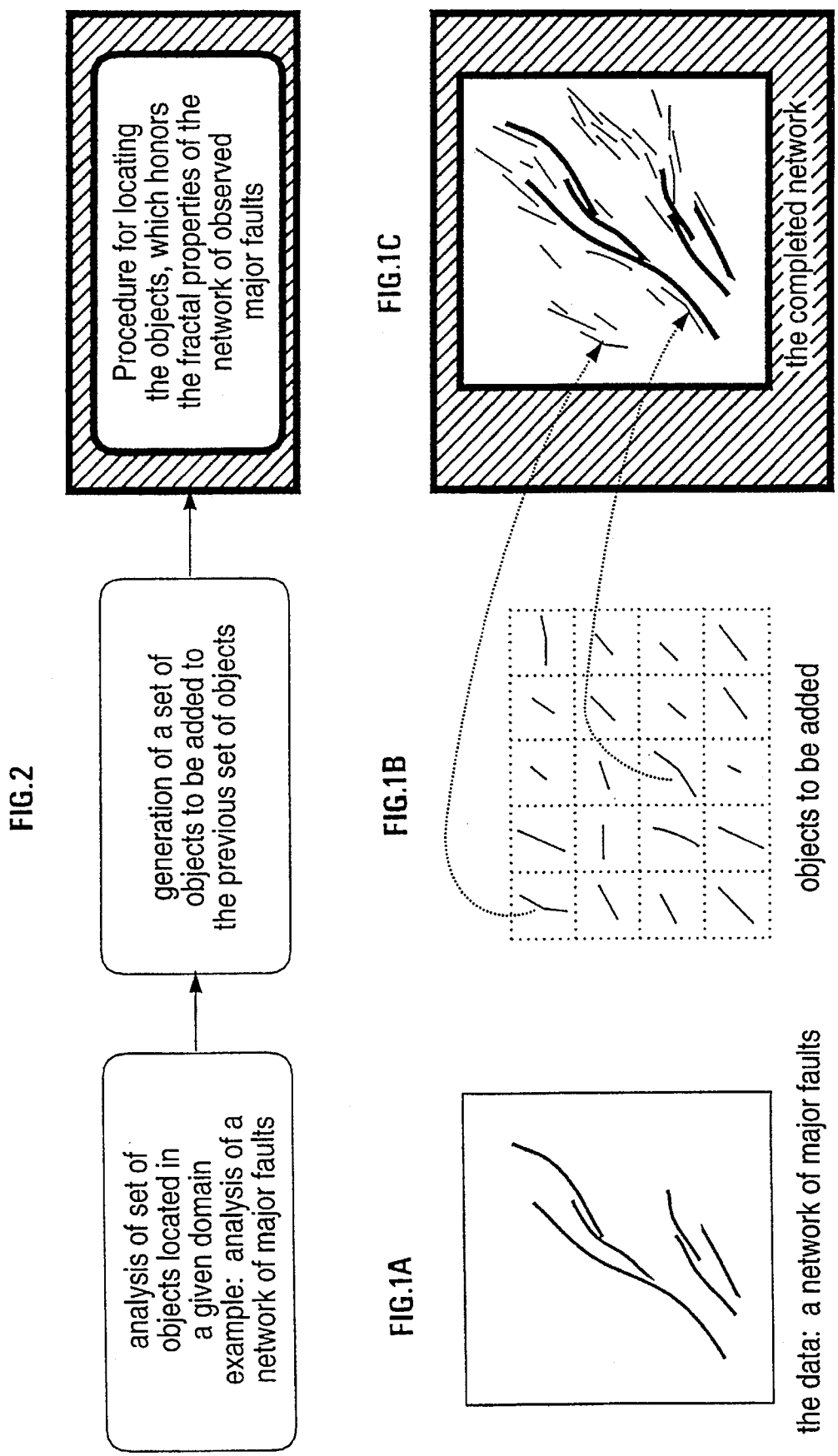

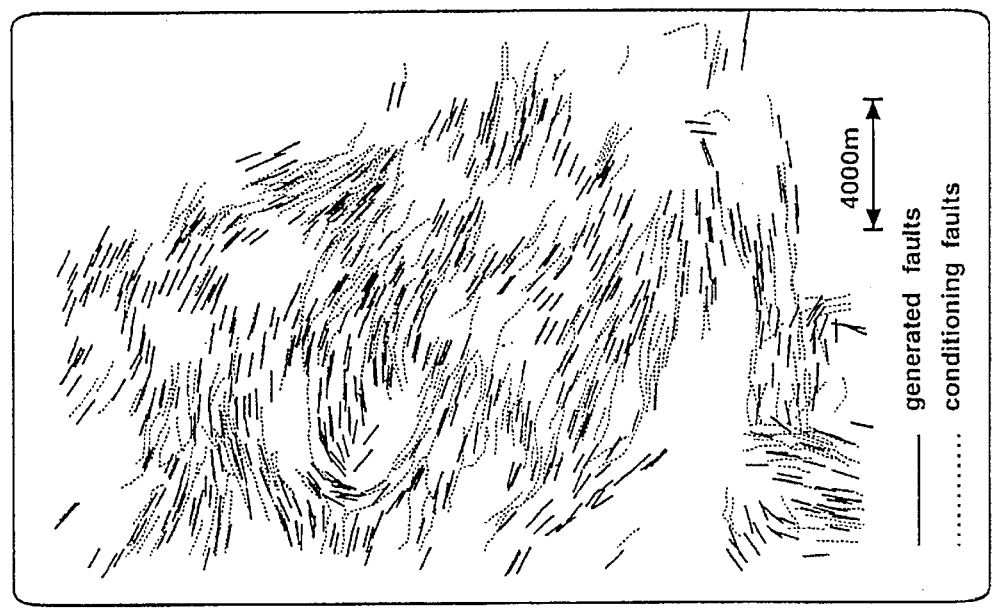

METHOD FOR MODELLING THE SPATIAL DISTRIBUTION OF GEOMETRIC OBJECTS IN AN ENVIRONMENT, SUCH AS FAULTS IN A GEOLOGIC FORMATION

BACKGROUND OF THE INVENTION

1. Field of the Invention

The invention relates to a method for modelling the spatial distribution of geometric objects in a discontinuous environment, such as, for example, fault networks in a geologic formation.

The method according to the invention, when applied to the study of the subsoil for example, can notably serve to optimize the production from oil reservoirs at different stages of their development.

2. Description of the Prior Art

Engineering techniques for naturally fractured subsurface reservoirs are simply based on the geometric characterization of their fracture networks. There is a lack of tools specially designed for this purpose and suited to the petroleum geologic context. Through lack of such tools, the results of geologic expert evaluations cannot be quantified in terms that are workable by reservoir engineers.

Knowledge of the distribution of the fractures in a geologic formation is of great importance first for optimizing the location and the spacing between the wells that are to be drilled through an oil formation.

Furthermore, the geometry of the fracture network conditions influences the displacement of fluids on the reservoir scale as well as on the local scale, where it determines the elementary matrix blocks in which the oil is trapped. Knowledge of the distribution of the fractures is thus also very useful at a later stage for the reservoir engineer who wants to extrapolate the production curves and to calibrate the models simulating reservoirs.

The development of naturally fractured reservoirs thus requires better knowledge of the geometry of the fracture networks and of their contribution to the orientation of the flows.

It is known that two aspects have to be taken into account when it is desired to model a naturally fractured reservoir from a geometric as well as from a geologic point of view: the scale effect and the genesis of the fractures.

Multiscale analysis techniques such as the fractal analysis are increasingly used currently, which shows that the scale effect is one of the major difficulties encountered when dealing with fractured environments.

It is known that, whatever the observation scale may be, an area appears discontinuous because of the relatively large fractures in relation to the dimensions of this area. A nearly unlimited range of different fracture sizes can be found in a reservoir.

When the flows are modelled on the scale of a reservoir, the major faults, drain holes or barriers, are explicitly considered. Fractures of a smaller size can be taken into account by bringing in an equivalent continuous environment exhibiting so-called double porosity characteristics. In order to determine the characteristics of this equivalent virtual environment, it is however necessary to consider explicitly the geometry of the system of fractures, whereas the network of pores and of microcracks is defined by means of the equivalent continuous environment referred to as a "rock matrix". Whatever their size category, fractures play a part in a given fluid flow process.

Besides this scale effect, it is also known that there is a relationship between small-size and large-size discontinuities. Major faults for example can be the result of the coalescence of minor faults. It is also known that a certain type of fracturing related to folds is associated with the structure of the field as well as with major faults in the case of a roll-over. The analysis of a configuration of fractures on a given scale must integrate geologic characteristics on different scales because the fractures observable on all scales are connected with one another.

It appears that most of the fault networks observed, particularly in petroleum geology, are incomplete because the measuring tools used only detect the largest faults. The minor faults of lower extension, which can nevertheless play an important part in the circulation of fluids, remain inaccessible for observation.

It has been shown in the last few years that certain natural fault networks exhibit fractal properties because of the chaotic geometry, as shown notably in the different documents listed hereafter:

Walsh J. J. and J. Watterson, Population of Faults and Fault displacements and their Effects on Estimates of Fault-Related Regional Extension, in J. Struct. Geol.; 14, 701–712, 1992;

Davy P. and al, Some Consequences of a Proposed Fractal Nature of Continental Faulting, Nature, 348, 56–58, 1990.

New techniques for predicting the geometry of so-called subseismic minor faults have been presented, notably by:

Gauthier B. D. M. et al, Probabilitic Modelling of Faults Below the Limit of Seismic Resolution in Pelican field, North Sea, offshore United Kingdom, The AAPG Bulletin, Vol.77, No.5, pp. 761–777, 1993.

They mainly generate fault geometries randomly through an extrapolation of the known distribution of the fault lengths, calibrated on a so-called "fractal" distribution of lengths.

It should however be noted that the modelling of minor faults in a known geometry of major faults, allowed by applying well-known techniques, does not lead to entirely satisfactory and representative results because the fault network obtained does not have a sufficiently strict fractal nature.

SUMMARY OF THE INVENTION

Glossary

For a good comprehension of the description hereunder, it should be understood that geologists use the following definitions:

A "fracture" is a plane discontinuity of very low thickness in relation to its extension, and which represents a breaking plane of rock;

a "fault" is a break due to an external stress applied to the material and followed by a relative displacement of the two faces of a breaking plane;

a "diaclase" is a breaking of the material in mode I, without relative displacement of the faces of the breaking plane; and an "extrados fracture" is a breaking plane formed in mode I at the back of a fold.

The method according to the present invention allows improvement of the results obtained until now in the prediction, in the statistical sense of the term, of the detailed configuration of a fault network inside a geologic structure with a more rigorous regard for its fractal nature.

The object of the invention is thus to model notably the configuration of faults in a subsoil zone having a base network having major faults detected by means of an exploration of the zone, and corresponding to the same type of tectonic event, by positioning in this network minor faults that have not been detected during the exploration.

The method comprises an analysis of this base network so as to determine its fractal characteristics and a successive selection of minor faults randomly from a group of minor faults by observing a given statistical distribution.

It comprises positioning each of these minor faults by:

determining a fractal dimension of the base network, as well as the density function defining the distribution of the fault lengths;

selecting a range of fault lengths by extrapolation of the defined length distribution; and positioning each fault in the base network randomly, and testing the positioning so as to check that the network of faults positioned in this manner retains a fractal nature.

The orientation to be given to the faults positioned in the zone model is for example determined as a function of a set of known orientation values at different points of the zone studied and notably as a function of the orientations of the nearest major faults.

According to a particular embodiment, it is possible to promote the positioning of minor faults in selected portions of the zone, by biasing randomly the process for selecting the location of each of these minor faults. This can be achieved by subdividing the zone into meshes, by assigning a probability to each mesh and, for each positioned minor fault, by selecting randomly a mesh from all the meshes according to their probability density function, then by randomly selecting the coordinates of the positioned point in this mesh.

The random selection process can also be carried out by achieving for each fault successively a random selection of its length, a site selection and a trace determination as a function of the length randomly selected, of the selected site and of local orientations to be observed.

BRIEF DESCRIPTION OF THE DRAWINGS

Other features and advantages of the method according to the invention will be clear from reading the description hereafter of an embodiment given by way of non limitative example, with reference to the accompanying drawings in which:

FIGS. 1A, 1B, 1C diagrammatically show respectively a base network, a set of minor faults to be positioned into the base network and the network obtained after positioned the set;

FIG. 2 diagrammatically shows the positioning algorithm of each minor fault in a network of known major faults;

FIGS. 7A, 7B & 7C show respectively, a real fault configuration and another two obtained by modelling according to the invention.

I POSITIONING METHOD

The method according to the invention is a trial-and-error method based on the so-called box-counting technique (elementary cell counting) described by:

Mandelbrot B. B., Stochastic Models for the Earth's Relief, the Shape and the Fractal Dimension of Coastlines, and the Number-Area Rule for Island, in Proc. Nat. Acad. Sci., 72, 3825–3828, 1975.

It should be noted that this box-counting techniques permits representing of the fractal nature of a network of geometric objects in a domain studied by dividing this domain into meshes with grids of different resolutions. For each mesh pattern, the number of meshes intersecting at least one object of the set studied is counted. The number of meshes obtained is represented as a function of the size of the meshes in a log-log diagram. If the points obtained stand in a straight line of slope -a (a>0), the set is referred to as "factal of dimension a".

The method according to the invention comprises applying this known technique in order to form a network (FIG. 1C) by positioning minor faults (FIG. 1B) one by one in a major fault network or base network of a subsoil zone (FIG. 1A). This is performed by seeking at random, for each one of them, a positioning that meets the imposed fractal dimension conditions. It comes within the scope of the process as follows:

I-1 Definition of the log-log curve that is to be observed by the fault network to be modelled If a fractal dimension a has for example been fixed for the base network, a line of slope -a (FIG. 4A) is defined, that defines in the diagram a half space in which the log-log curve of this network is to be inscribed. In order that the imposed fractal dimension condition can be met, the log-log curve of the network to be modelled must be superimposed on this line of slope -a.

I-2 Drawing up the list of the minor faults to be added and positioned in the base network Each minor fault to be positioned is defined by its shape or by its contour (FIG. 1B), but its positioned (Xi,Yi) in the network to be modelled (FIG. 1C) is not determined yet. The modeller is left free to choose the way to select the objects to be positioned (in this case the faults). However, the positioning method is applied regardless of the technique selected for choosing the objects to be positioned.

I-3 Random selection of the successive positioning of the minor faults

It is now desired to position each fault in the base network while meeting the imposed fractal dimension condition. For each fault, sites $(X_i, Y_i)$ are selected at random, and they are tested by means of a positioning test until one site that does not infringe the imposed condition is found.

I-4 Positioning test

Figure 3:
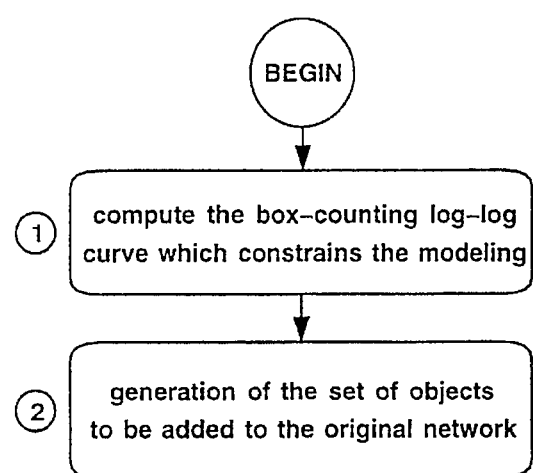
FIG. 3 shows a planting flowchart for each newly planted fault.
Figure 4A:
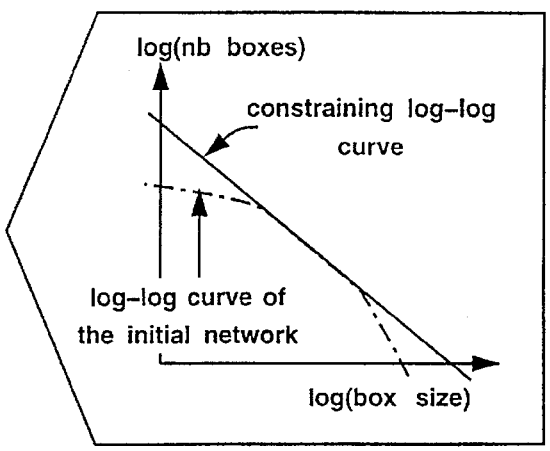
FIGS. 4A, 4B, 4C diagrammatically show different log-log curves allowing the validity of each new fault positioning according to FIG. 3 to be successively tested.
Figure 4B:
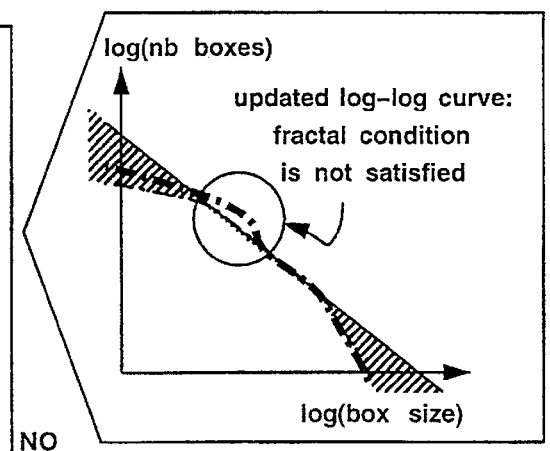
Figure 4C:
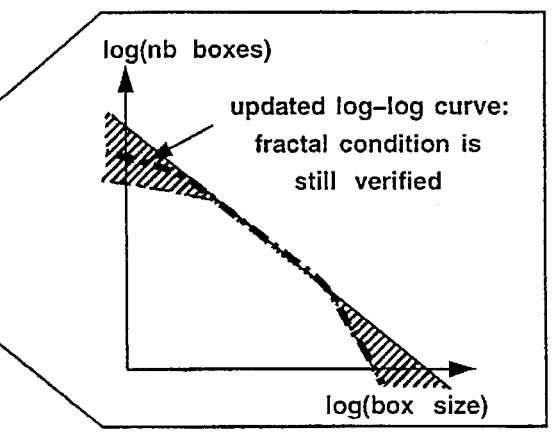

For each new fault to be positioned, the positioning test schematized by the flowchart in FIG. 3 and illustrated by FIGS. 4A to 4C comprises:

determining the new log-log curve modified by its positioning and checking that this new curve is inscribed in the domain defined by the log-log curve of the network in its current state (base network and faults already positioned) and the line of slope -a.

If the condition is met (the log-log curve of the modified network is actually situated between that corresponding to the base network and the line of slope -a as shown for example in FIG. 4C), the current network is updated by adding the object with its new position thereto.

If the condition is not met (a portion P of the log-log curve passing above the line of slope -a for example, as shown in FIG. 4B), a new positioning is randomly selected and the process is carried on until a satisfactory positioning is obtained.

Finally, stages I-3 and I-4 are repeated for each one of the successive faults to be positioned.

With the positioning procedure presented above, the only constraint imposed concerning the positioning of the "objects" is to meet the imposed fractal dimension condition. The objects are positioned at random in the domain studied, until a satisfactory position is found.

It is not necessary to impose a particular relationship between the fractal dimension imposed on the model and the distribution of the fault lengths. However, it should be noted that this length distribution can change the range of cell or mesh sizes for which the fractal property is established.

II VARIANT OF THE METHOD

The implementation variant defined hereafter allows a user to favor the position of the objects in certain areas of the zone studied. In the case of a fault in what geologists generally refer to as the "downthrown block" of the major faults, i.e. a part of the zone where the distribution of the minor faults in the major fault network is not symmetrical.

Figure 5A:
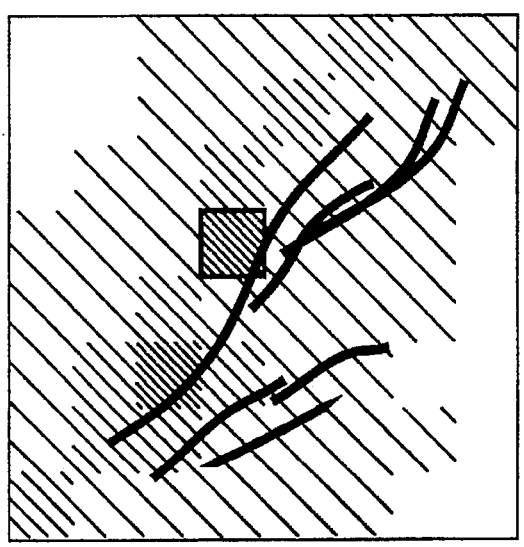
FIGS. 5A, 5B, 5C illustrate a biased planting process for objects such as faults.
Figure 5B:
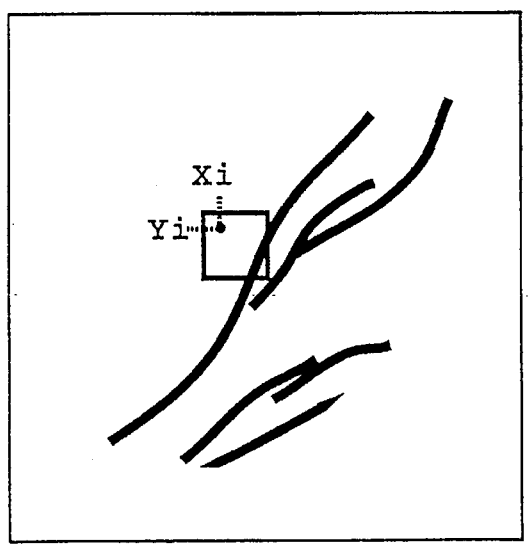
Figure 5C:
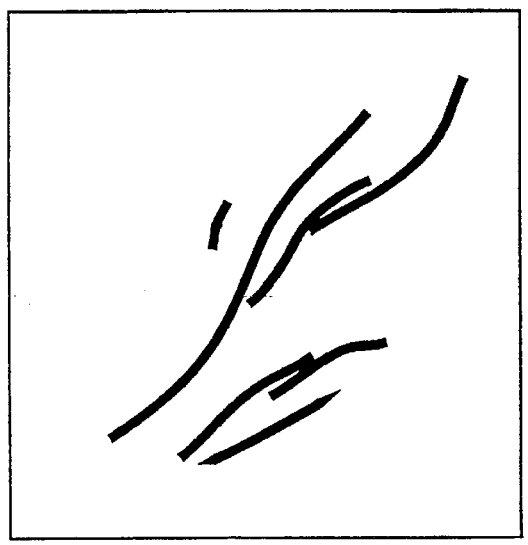

In order that the faults created appear in particular zones, the previous procedure is modified by using a method known in the art and referred to as "biased Poisson method". Instead of testing the positioning validity at random, the following stages are performed:

a) the domain or zone to be positioned is subdivided by a of meshes and a probability is assigned to each mesh;

b) for each positioning a mesh is selected randomly from all the meshes according to their probability density function (FIG. 5A), and c) the coordinates (xi, yi) of the positioning point in this mesh are randomly selected (FIG. 5B) by following a Poisson process in order to obtain their exact values prior to carrying out the positioning test as previously.

III OTHER PROCEDURE FOR IMPLEMENTING THE METHOD

In the particular case where a network of subseismic faults is randomly selected it is possible to change the order of the positioning procedure stages defined in I). Instead of determining entirely the shape of a fault, i.e. the trace thereof, the following stages are thus performed successively:

a) random selection of the fault length;

b) site selection;

c) determination of the trace as a function of the length selected by lot and of the site chosen in the two previous stages;

d) testing of the fractal property of the new network; and e) return to stage b) according to the result of the test in stage d).

This succession of stages makes it possible to generate fault networks whose orientation is not stationary in the domain studied, which in some cases will provide more realistic synthetic networks.

III-1) Trace determination procedure

This procedure is applied in the case where the mapping of the orientation of the network of faults to be positioned is available, i.e. when the domain or zone to be studied is meshed and an azimuth value has been assigned to each of the meshes.

To that effect, the method can be advantageously used for determining, by interpolation between known discrete orientation values, the mapping of an orientation field, that is described in French Patent Application FR-94/12,515.

Figure 6A:
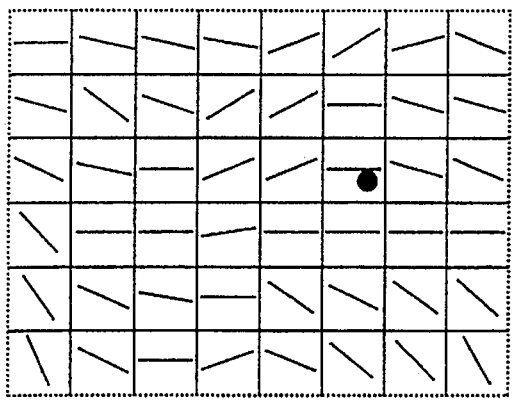
FIGS. 6A to 6F illustrate a fault tracing process.
Figure 6B:
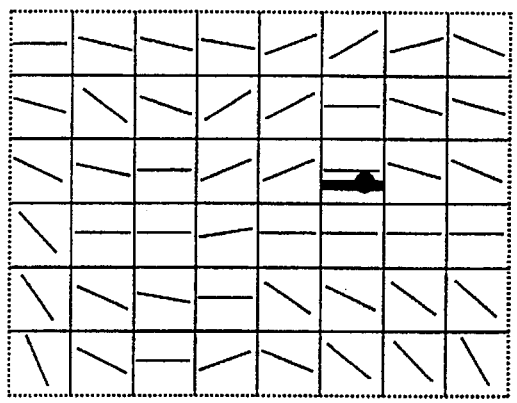
Figure 6C:
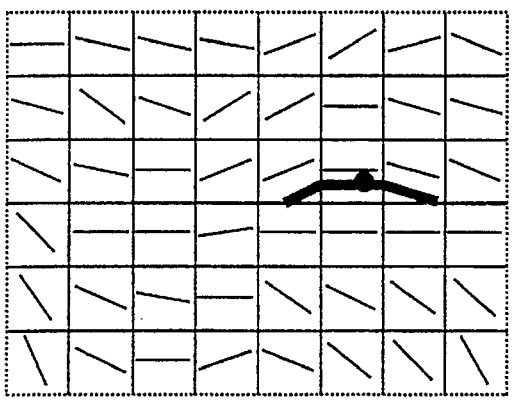
Figure 6D:
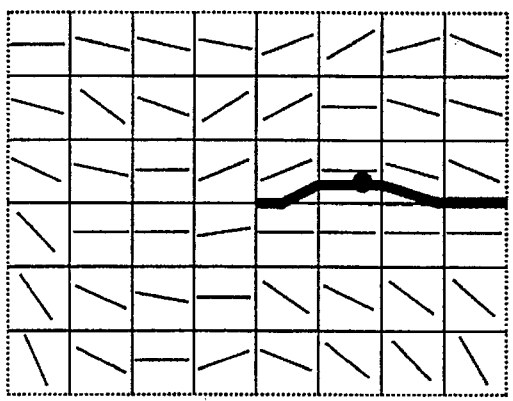
Figure 6E:
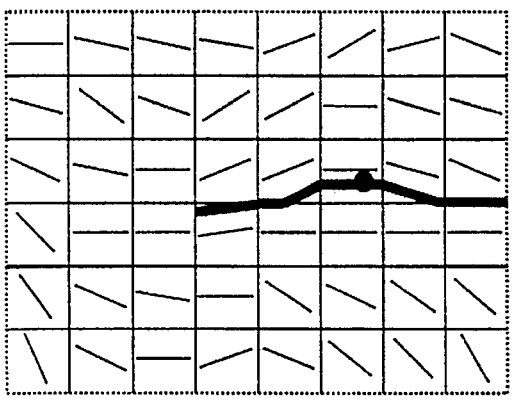

The determination of the trace of a fault to be positioned as a function of its length (previously selected during stage III-a above) and of the site selected (stage III-b illustrated in FIG. 6A) can be achieved as follows.

Figure 6F:
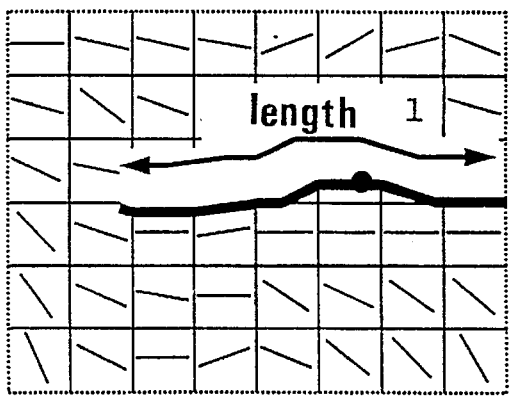

A trace of the fault is determined in the form of a broken line coming from a fixed positioned point (FIG. 6A), whose successive segments are parallel, in each mesh encountered, to the azimuth that is imposed thereon. This broken line is built up step by step (FIGS. 6B to 6F) and it is extended mesh after mesh until it reaches the imposed length (FIG. 6F) that has been previously determined.

However, it is not absolutely necessary to abide strictly by the azimuth imposed in each mesh. An angular offset randomly selected according to a given statistical law can be introduced in order to take a certain local dispersion of the fault azimuths better into account.

IV APPLICATION EXAMPLE

The method according to the invention has been validated by comparison between a network modelled according to the procedure described above and the fault network determined after the thorough study of a known geologic structure, relatively homogeneous as far as tectonics are concerned, this network consisting of 7300 faults whose lengths range between 30 m and 3500 m. A subnetwork of main faults has been isolated to serve as a constraint for the creation of synthetic subseismic faults.

By means of a method referred to as "box-counting", it has first been checked that the selected network was fractal and its fractal dimension has been calculated, which is 1.71 with elementary cell sizes raging between 400 m and 3000 m. After having determined the statistical distribution of the fault lengths, several subseismic fault networks have been created, with faults whose lengths could be classified within well-determined length ranges (between 500 m and 600 m, between 500 m and 800 m or between 500 m and 1000 m) by using the positioning procedure described above. FIGS. 7A, 7B, 7C show respectively, for the first one, the distribution of the faults really detected in the geologic structure, and the other two, that of modelled faults within two different length ranges.

I claim:

1. A method for modelling a configuration of a fault network in a subsoil zone including a group of major faults detected by means of an exploration of the zone, by positioning also in the fault network, corresponding to an identical tectonic event, minor faults that have not been detected during the exploration, the method comprising analyzing the fault network to determine fractal characteristics thereof successively by randomly selecting minor faults and positioning each of the minor faults by:

determining a fractal dimension of the fault network and a density function defining a distribution of lengths of the faults;

selecting a range of lengths of the faults by extrapolation of the defined distribution of the lengths of the faults; and successively randomly positioning the minor faults in the fault network and testing positioning thereof to check if the fault network with each of the positioned minor faults remains a fractal fault network.

2. A method as recited in claim 1 further comprising:

giving an orientation to each minor fault which is determined as a function of a set of known orientation values at different points of the zone.

3. A method as recited in claim 1 further comprising:

giving orientations to the minor faults which are determined as a function of orientations of major faults which are nearest to the minor faults.

4. A method as recited in claim 2 further comprising:

giving orientations to the minor faults which are determined as a function of orientations of major faults which are nearest to the minor faults.

5. A method as recited in claim 1 further comprising:

positioning each minor fault in a selected portion of the zone based upon random selection of a location of each minor fault.

6. A method as recited in claim 2 further comprising:

positioning each minor fault in a selected portion of the zone based upon random selection of a location of each minor fault.

7. A method as recited in claim 3 further comprising:

positioning each minor fault in a selected portion of the zone based upon random selection of a location of each minor fault.

8. A method as recited in claim 4 further comprising:

positioning each minor fault in a selected portion of the zone based upon random selection of a location of each minor fault.

9. A method as recited in claim 5 wherein:

the zone is subdivided into meshes, a probability is assigned to each mesh, a mesh is randomly selected from all meshes according to a probability density function of each of the meshes, and coordinates of positioned points (xi, yi) in the randomly selected mesh are randomly selected.

10. A method as recited in claim 6 wherein:

the zone is subdivided into meshes, a probability is assigned to each mesh, a mesh is randomly selected from all meshes according to a probability density function of each of the meshes, and coordinates of positioned points (xi, yi) in the randomly selected mesh are randomly selected.

11. A method as recited in claim 7 wherein:

the zone is subdivided into meshes, a probability is assigned to each mesh, a mesh is randomly selected from all meshes according to a probability density function of each of the meshes, and coordinates of positioned points (xi, yi) in the randomly selected mesh are randomly selected.

12. A method as recited in claim 8 wherein:

the zone is subdivided into meshes, a probability is assigned to each mesh, a mesh is randomly selected from all meshes according to a probability density function of each of the meshes, and coordinates of positioned points (xi, yi) in the randomly selected mesh are randomly selected.

13. A method as recited in claim 9 wherein:

the random selection of each mesh is performed for each minor fault successively by a random selection of length, a site selection and a trace determination as a function of the randomly selected length of a selected site and of local orientations to be observed.

14. A method as recited in claim 10 wherein:

the random selection of each mesh is performed for each minor fault successively by a random selection of length, a site selection and a trace determination as a function of the randomly selected length of a selected site and of local orientations to be observed.

15. A method as recited in claim 11 wherein:

the random selection of each mesh is performed for each minor fault successively by a random selection of length, a site selection and a trace determination as a function of the randomly selected length of a selected site and of local orientations to be observed.

16. A method as recited in claim 12 wherein:

the random selection of each mesh is performed for each minor fault successively by a random selection of length, a site selection and a trace determination as a function of the randomly selected length of a selected site and of local orientations to be observed.

* * * * *